US006653392B2

(12) United States Patent
Nasli-Bakir et al.

(10) Patent No.: US 6,653,392 B2
(45) Date of Patent: Nov. 25, 2003

(54) ADHESIVE SYSTEM

(75) Inventors: Benyahia Nasli-Bakir, Saltsjö-Boo (SE); Stefan Lindberg, Vallentuna (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/811,512

(22) Filed: Mar. 20, 2001

(65) Prior Publication Data

US 2001/0031825 A1 Oct. 18, 2001

Related U.S. Application Data

(60) Provisional application No. 60/190,533, filed on Mar. 20, 2000.

(30) Foreign Application Priority Data

Mar. 20, 2000 (EP) ............................................. 00850048

(51) Int. Cl.$^7$ ............................................... C08L 61/00
(52) U.S. Cl. ....................................... 524/512; 524/510
(58) Field of Search .................................. 524/510, 512

(56) References Cited

U.S. PATENT DOCUMENTS

| 3,989,767 | A | * | 11/1976 | Homma | ...................... | 260/834 |
| 4,756,714 | A | * | 7/1988 | Hendrix | ...................... | 8/115.6 |
| 4,940,841 | A | | 7/1990 | Dickerhof | ...................... | 524/510 |
| 5,055,518 | A | * | 10/1991 | Dupont | ...................... | 525/59 |
| 5,087,690 | A | * | 2/1992 | Demarey | ...................... | 528/230 |
| 5,330,846 | A | | 7/1994 | Eisele | ...................... | 428/503 |
| 5,540,987 | A | * | 7/1996 | Mudge | ...................... | 428/288 |
| 5,629,377 | A | * | 5/1997 | Burgert | ...................... | 524/832 |
| 6,306,555 | B1 | * | 10/2001 | Schulz | ...................... | 430/270.1 |

FOREIGN PATENT DOCUMENTS

| DE | 2158604 | 5/1973 |
| EP | 0176709 | 4/1986 |
| EP | 0501174 | 9/1992 |

OTHER PUBLICATIONS

Derwent Abstract of DE 3430248.
Derwent Abstract of DE 2158604.
Patent Abstracts of Japan of Publication No. 5812066, publication date Jul. 18, 1983.
English language translation from Japanese of Laid Open No. 1983–120661, Laid–Open Date Jul. 18, 1983.

* cited by examiner

Primary Examiner—Edward J. Cain
(74) Attorney, Agent, or Firm—David J. Serbin

(57) ABSTRACT

The invention relates to an adhesive system comprising (a) an etherified amino resin, (b) a polymer prepared from one or more ethylenically unsaturated monomers, (c) a curing agent, and (d) a polyvinyl alcohol and the use thereof for gluing wood based products. The invention also relates to a hardener composition for gluing systems of the amino resin type comprising, (b) a polymer prepared from one or more ethylenically unsaturated monomers, said polymer containing post-crosslinking groups, (c) a carboxylic acid and (d) a polyvinyl alcohol and the use thereof for formulating an adhesive system. The invention further relates to a method of application of the adhesive system or the hardener composition onto the surface to be glued.

44 Claims, No Drawings

ADHESIVE SYSTEM

This application claims the benefit of Provisional application Ser. No. 60/190,533, filed Mar. 20, 2000.

The present invention relates to an adhesive system comprising an etherified amino resin, a polymer prepared from one or more ethylenically unsaturated monomers, a curing agent and a polyvinyl alcohol. The present invention also relates to the use of the adhesive system for gluing wood-based products and to a hardener composition for use in amino resin based gluing systems. Furthermore, the invention relates to a method of application of the adhesive system.

Adhesives systems suitable for use in wood-based constructions for outdoor use are generally based on formaldehyde resins, such as phenol-resorcinol-formaldehyde (PRF), phenol-formaldehyde (PF) and melamine-urea-formaldehyde (MUF). The major disadvantages of these adhesive systems are their long curing time at room temperature (~20° C.) and week bonding performance at temperatures below 20° C. Typical pressing times for these systems are in the range of 5 to 24 hours at 20° C. In addition to that, an after curing time, especially for melamine based resins, of several days is needed before the beams can be transported to the customers. These factors, of course, hamper seriously the productivity in, for example, laminated beam industries.

Furthermore, it is also known that amino resins, such as urea-formaldehyde (UF) resin, can be combined with dispersions of polymers of vinylic, acrylic, or butadiene-styrene type, in order to obtain improved bonding performance. Adhesives based merely on dispersions of polymers, like polyvinyl acetate, are not at all suitable for use in load bearing constructions. They do not meet the standards for, e.g., laminated beams. This is mainly due to their thermoplastic properties imparting creep in the construction and a poor durability.

EP 0 501 174 B1 discloses a hardening composition for urea-formaldehyde glues containing an aqueous emulsion of a polyvinyl acetate comprising post-crosslinking groups, an ammonium salt and urea. However, this hardening composition is not suitable for adhesive systems that have to be cured at room temperature, or at lower temperatures.

Thus, technical solutions are still sought for the need to find adhesive systems, which are fast curing even at room temperature or at lower temperatures and provide constructions with strong glue joints that meet the required standards for the end use products.

Accordingly, the present invention provides an adhesive system; a hardener composition suitable for use in amino resin based adhesive systems and a method of application of the adhesive system, by which the above-mentioned problems can be overcome.

The adhesive system according to the invention is defined in the appended claims. It comprises (a) an etherified amino resin, (b) a polymer prepared from one or more ethylenically unsaturated monomers, (c) a curing agent, and (d) a polyvinyl alcohol.

The etherified amino resin used in the adhesive system according to the invention, as the resin component, can be any etherified amino resin, such as etherified urea-formaldehyde, etherified melamine-urea-formaldehyde, etherified melamine-formaldehyde, or etherified melamine-urea-phenol-formaldehyde resin. Preferred etherified amino resins are etherified melamine-urea-formaldehyde and etherified melamine-formaldehyde and most preferred is etherified melamine-formaldehyde.

The term "etherified amino resin", as used herein refers to an amino resin that has been modified by reaction with an alcohol, such as methanol, ethanol or butanol. The degree of etherification can be defined by $^{13}C$ NMR according to, e.g., the following formula:

$$\text{Degree of etherification} = \frac{RNCH_2(O-CH)_3}{RNHCH_2(O-CH)_3 + CH_2OH} \times 100\%$$

Suitably the etherified amino resin has a degree of etherification of 4–95% preferably 10–75% and most preferably 30–60%.

The resin component in the adhesive system may be comprised of a mixture of an etherified and a non-etherified amino resin. Suitable non-etherified amino resins include urea-formaldehyde, melamine-urea-formaldehyde, melamine-formaldehyde and melamine-urea-phenol-formaldehyde.

The amount of the etherified amino resin in the resin component is suitably $4 \geq$ weight %, preferably $\geq 50.0$ weight %, and most preferably $\geq 90.0$ weight %, based on the solids of the resin component.

The total amount of the resin component in the adhesive system is suitably 10–90 weight %, preferably 40–85 weight % and most preferably 50–80 weight %, based on the solids of the adhesive system.

The polymer according to the invention is suitably a homopolymer or copolymer prepared from one or more ethylenically unsaturated monomers. Examples of suitable ethylenically unsaturated monomers are vinylic monomers, such as vinyl esters, e.g., vinyl acetate, vinyl propionate, vinyl butyrate and comonomers thereof with, e.g., ethylene; alkyl esters of acrylic and methacrylic acid such as methyl acrylate, methyl methacrylate, ethyl acrylate, n-butyl acrylate, etc.; butadiene-styrene and derivates thereof, such as carboxylated butadiene-styrene; substituted or unsubstituted mono- and dialkyl esters of alpha, beta-unsaturated dicarboxylic acids such as the substituted and unsubstituted mono- and dibutyl, mono- and diethyl maleate esters as well as the corresponding fumarates, itaconates and citronates; alpha beta-unsaturated carboxylic acids such as crotonic, acrylic and methacrylic acids and mixtures thereof. Polymers based on vinyl acetate are preferred. Preferably the polymer is prepared from at least 50 weight % vinyl acetate, based on the total weight of the monomers.

According to a preferred embodiment of the invention the polymer comprises post-crosslinking groups. The post-crosslinking groups can be incorporated into the polymer by copolymerising one or more ethylenically unsaturated monomers with at least one monomer comprising at least one post-crosslinking group. Suitable post-crosslinking groups include N-alkylol, N-alkoxymethyl, carboxylate and glycidyl groups.

By post-crosslinking monomer is herein meant a monomer having a first reactive functional group that renders the monomer copolymerisable with ethylenically unsaturated comonomer(s) and a second functional group that does not enter into the copolymerisation reaction during formation of the polymer, but provides a reactive site on the copolymer that may subsequently be reacted under, for example, acidic conditions, with another reactive site on the copolymer and/or the amino resin to crosslink the copolymer and/or the amino resin.

Suitable post-crosslinking monomers include, N-alkylol acrylamides, e.g., N-methylol acrylamide, N-ethanol acrylamide, N-propanol acrylamide, N-methylol methacrylamide, N-ethanol methacrylamide, N-propanol methacrylamide, N-methylol maleamide, N-methylol maleamic acid, N-methylol maleamic acid esters; the N-alkylol amides of the vinyl aromatic acids, such as N-methylol-p-vinylbenzamide and the like; also N-(alkoxymethyl) acrylates and methacrylates, where the alkyl group has from 1–8 carbon atoms, such as N-(methoxymethyl) acrylamide, N-(butoxymethyl) acrylamide, N-(methoxymethyl) methacrylamide, N-(butoxymethyl) allyl carbamate and N-(methoxymethyl) allyl carbamate, and mixtures of these monomers with allyl carbamate, acrylamide or methacrylamide; and also triallyl cyanurate. Preferably N-methylol acrylamide, or N-(butoxymethyl) acrylamide is used.

The polymer is suitably prepared from 0.1–10 weight % and preferably 0.2–6 weight % post-crosslinking monomer, based on the total weight of the monomers.

In a preferred embodiment the copolymer is based on vinyl acetate and N-methylol acrylamide.

The amount of the polymer in the adhesive system is suitably 5–60 weight %, preferably 10–50 weight % and most preferably 15–30 weight %, based on the solids of the adhesive system.

Mixtures of polymers containing post-crosslinking groups and polymers without post-crosslinking groups may also be used according to the invention. For example, the polymer may comprise both polyvinyl acetate without post-crosslinking groups and vinyl acetate based polymer containing post-crosslinking groups.

Preferably the polymer according to the invention is used in a form of an aqueous dispersion.

Suitable curing agents include organic acids that have a rapid curing rate even at room temperature (~20° C.) and below that. Preferred organic acids include carboxylic acids, such as formic and maleic acid, and most preferably formic acid. The curing agent can be present in the adhesive system in an amount of suitably 240 weight-%, preferably 5–20 weight-%, and most preferably 7–15 weight-%, based on the solids of the adhesive system.

Although polyvinyl alcohol is originally present in polyvinyl acetate (PVAc) dispersions in an amount of 4–6 weight-%, it has been found according to the present invention that an extra addition of PVA into the adhesive system, beyond that originally present in the PVAc dispersion, further improves the water resistance and glue joint strength of the finished products. Suitably the polyvinyl alcohol used has a degree of hydrolysis >75% and can be present in the adhesive system in an amount of 0.1–20 weight %, preferably 1–10 weight %, and most preferably 3–7 weight %, based on the solids of the adhesive system. Thus, the total amount of PVA in the adhesive system, including the PVA originally present in the PVAc dispersion, could be as high as 7–14 weight %, based on the solids of the adhesive system.

In a preferred embodiment of the invention the components b)-d) are mixed together into one component e), thus forming a hardener composition.

The adhesive system may also comprise fillers or other additives, such as glycol, suitable for the desired end use of the adhesive system.

The solids content of the adhesive system may be suitably 20–80 weight %, preferably 30–70 weight % and most preferably 45–65 weight %. The remaining part up to 100 weight % consist of water.

The term "adhesive system", as used herein means a curing formulation of a resin and a hardener component and other suitable additives.

The claimed invention provides for adhesive systems that give improved pressing and after curing times, water resistance and glue joint strength even when cured at room temperature or below that. These adhesives systems are suitable for gluing wood-based products and preferably wood-based products for outdoor use, for example, laminated beams, finger joints and I-beams.

The hardener composition according to the present invention is defined in the appended claims. It comprises (b) a polymer prepared from one or more ethylenically unsaturated monomers, said polymer containing post-crosslinking groups, (c) a carboxylic acid and (d) a polyvinyl alcohol.

The polymer is a copolymer of one or more ethylenically unsaturated monomers and at least one monomer comprising at least one post-crosslinking group.

Suitable ethylenically unsaturated monomers and monomers comprising post-crosslinking groups for use in production of the polymer according to the invention are described herein above.

The amount of the polymer in the hardener composition is suitably 3–85 weight %, preferably 25–70 weight % and most preferably 45–65 weight %, based on the solids of the hardener composition. Preferably the polymer is used in a form of an aqueous dispersion.

The use of a carboxylic acid, which preferably is maleic or formic acid, provides a fast curing hardener composition even at room temperature, or below that.

Suitable amount of acid in the hardener composition is 2–50 weight %, preferred 10–50 weight % and most preferred 20–35 weight %, based on the solids of the hardener composition.

Preferably, a polyvinyl alcohol with a degree of hydrolysis of >75% is used. It is present in an amount of 0.140 weight %, preferably 4–30 weight % and most preferably 8–15 weight %, based on the solids of the hardener composition. The addition of extra polyvinyl alcohol, beyond that which originally may be present in, e.g., a PVAc based aqueous polymer dispersion, provides for further improved water resistance and adhesion properties of the adhesive systems where the claimed hardener composition is used.

If desired the hardener composition may also comprise fillers or other additives, such as glycol, suitable for the desired end use of the hardener composition.

The solids content of the hardener composition may be suitably 5–80 weight %, preferably 10–60 weight % and most preferably 30–50 weight %. The remaining part up to 100 weight % consist of water.

The term "solids" (of the adhesive system and the hardener composition) as used herein also includes the weight of the pure acid used as a curing agent, even in case the curing agent is a volatile acid, like formic acid.

The claimed hardener composition is suitable for use in formulating adhesive compositions based on amino resins, resulting in water and creep resistant adhesives systems, which provide for constructions with strong adhesive joints.

Although liquid adhesive systems, i.e., the resin and the hardener components are in liquid form, are preferred according to the invention, pulverous adhesive systems, i.e., the resin and/or the hardener components is/are in a pulverous form, may also be used if so desired.

The method of application of the adhesive system components according to the claimed invention is defined in the appended claims.

According to one preferred embodiment of this method each of the components of the adhesive system, a)–d) is applied separately onto the surface to be glued.

According to another preferred embodiment component a) is applied separately and components b)–d) are mixed before application and applied as one component e), the hardener composition, onto the surface to be glued.

In a further preferred embodiment all of the components a)–d) are mixed together at the moment of application and applied as one component onto the surface to be glued.

In the method of the present invention, the resin and the hardener components can be applied in any order in the form of strands or by means of spraying or by means of a curtain, more suitably, the resin and hardener are applied in the form of strands, or, alternatively, the hardener composition can be applied by means of spraying and the resin in the form of strands, wherein the hardener composition in either case, preferably is applied following the application of the resin. Preferably they are both applied in the form of strands.

Suitable amounts of the components to be applied can be in the range of 100–500 g/m$^2$ depending, inter alia, on the feeding rate.

Suitable devices and applications forms that can be used in the method according to the present invention for the application in the form of strands of both the resin and the hardener components, are disclosed in WO 99/67027, WO 99/67028 and WO 99/67341, which are hereby incorporated herein by reference.

The invention is further illustrated by means of the following non-limiting examples. Parts and percentages relate to parts by weight and percent by weight, respectively, unless otherwise stated.

EXAMPLES

In the examples according to the invention as component a) an etherified melamine-formaldehyde (EMF) resin with an etherification degree of 46% and with a solids content of 68–72% was used. In the comparison examples as component a) a non-etherified melamine-formaldehyde (MF) resin with a solids content of 63–68% was used. Two different aqueous dispersions were used, one based on a polyvinyl acetate polymer containing post-crosslinking groups (PVAc-X) and one based on a conventional polyvinyl acetate polymer without post-crosslinking groups (PVAc).

Example 1

The composition of the hardener used is given below in table 1. The resin component used was etherified MF.

TABLE 1

| Component | Weight % based on the total weight of the hardener composition |
|---|---|
| PVAc-X dispersion | 22% |
| Formic acid | 11% |
| Polyvinyl alcohol | 5% |
| Water | 62% |

Example 2

Comparison

The same hardener composition as in example 1 was used and the resin component used was non-etherified MF.

Example 3

The composition of the hardener used is given below in table 2.

TABLE 2

| Component | Weight % based on the total weight of the hardener composition |
|---|---|
| PVAc-X dispersion | 27% |
| Formic acid | 11% |
| Polyvinyl alcohol | 0% |
| Water | 62% |

Example 4

Comparison

The same hardener composition as in example 3 was used and the resin component used was non-etherified MF.

Example 5

The composition of the hardener used is given below in table 3. The resin component used was etherified MF.

TABLE 3

| Component | Weight % based on the total weight of the hardener composition |
|---|---|
| PVAc | 27% |
| Formic acid | 11% |
| Polyvinyl alcohol | 0% |
| Water | 62% |

Example 6

Comparison

The same hardener composition as in example 5 was used and the resin component used was non-etherified MF.

Example 7

The composition of the hardener used is given below in table 4. The resin component used was etherified MF.

TABLE 4

| Component | Weight % based on the total weight of the hardener composition |
|---|---|
| PVAc dispersion | 22% |
| Formic acid | 11% |
| Polyvinyl alcohol | 5% |
| Water | 62% |

Example 8

Comparison

The same hardener composition as in example 7 was used and the resin component used was non-etherified MF.

The resin and the hardener components of the adhesive systems of the above described examples were separately applied, in a mixing ratio of 1:1, on 90 cm×15.5 cm pieces of spruce and in an amount of 350 g/m$^2$. Thereafter laminates were formed from the pieces, which were pressed at a temperature of 20° C., a pressure of 8 bar and a relative humidity of 60% for 2 hours. After 36 hours of after curing time the laminates were tested for delamination according to the EN 391 B standard. The results are shown in table 5 below.

TABLE 5

| Adhesive system according to | Delamination |
|---|---|
| Example 1 | 0.3% |
| Example 2 | 0.61% |
| Example 3 | 9.7% |
| Example 4 | 14.1% |
| Example 5 | 30.5% |
| Example 6 | 82.1% |
| Example 7 | 10.0% |
| Example 8 | 28.2% |

Evidently the claimed adhesive systems provide for improved glue joints in relation to prior art adhesive systems.

What is claimed is:

1. An adhesive system comprising, (a) a resin component comprising an etherified resin, (b) a polymer prepared from one or more ethylenically unsaturated monomers, (c) a curing agent, and (d) a polyvinyl alcohol, the amount of the resin component being 10–90 weight % based on the solids of the adhesive system.

2. An adhesive system according to claim 1, wherein the components a)–d) are present in the following indicated amounts in weight %, based on the solids of the adhesive system:
   a) from 40 to 85 weight %,
   b) from 10 to 50 weight %,
   c) from 5 to 20 weight %, and
   d) from 1 to 10 weight %.

3. An adhesive system according to claim 1, wherein the etherified amino resin has a degree of etherification of 10 to 75%.

4. An adhesive system according to claim 1, wherein the etherified amino resin is an etherified melamine-formaldehyde or an etherified melamine-urea-formaldehyde resin.

5. An adhesive system according to claim 1, wherein the polymer is a homopolymer or copolymer prepared from one or more monomers selected from the group consisting of vinyl esters, alkyl esters of acrylic and methacrylic acid, mono- and dialkyl esters of alpha, beta-unsaturated dicarboxylic acids, alpha beta-unsaturated carboxylic acids, styrene-butadiene and derivates thereof, and mixtures thereof.

6. An adhesive system according to claim 5, wherein the polymer is a homopolymer or copolymer based on vinyl acetate.

7. An adhesive system according to claim 1, wherein the polymer comprises post-crosslinking groups.

8. An adhesive system according to claim 7, wherein the post-crosslinking groups are incorporated into the polymer by copolymerising one or more ethylenically unsaturated monomers with at least one monomer comprising at least one post-crosslinking group.

9. An adhesive system according to claim 8, wherein the polymer is a copolymer of vinyl acetate and N-methylol-acrylamid.

10. An adhesive system according claim 1, wherein the curing agent is a carboxylic acid.

11. An adhesive system according to claim 10, wherein the carboxylic acid is formic acid or maleic acid.

12. An adhesive system according to claim 1 for use in gluing of wood-based products.

13. A hardener composition for gluing systems of the amino resin type comprising, (b) a polymer prepared from one or more ethylenically unsaturated monomers, said polymer containing post-crosslinking groups, (c) a carboxylic acid and (d) a polyvinyl alcohol.

14. A hardener composition according to claim 13, wherein the polymer is a homopolymer or copolymer prepared from one or more monomers selected from the group consisting of vinyl esters, alkyl esters of acrylic and methacrylic acid, mono- and dialkyl esters of alpha, beta-unsaturated dicarboxylic acids, alpha beta-unsaturated carboxylic acids, styrene-butadiene and derivates thereof, and mixtures thereof.

15. A hardener composition according to claim 14, wherein the polymer is a homopolymer or copolymer based on vinyl acetate.

16. A hardener composition according to claim 13, wherein the post-crosslinking groups are incorporated into the polymer by copolymerising one or more ethylenically unsaturated monomers with at least one monomer comprising at least one post-crosslinking group.

17. A hardener composition according to claim 16, wherein the polymer is a copolymer of vinyl acetate and N-methylol-acrylamid.

18. A hardener composition according claim 13, wherein the carboxylic acid is formic acid or maleic acid.

19. A hardener composition according to claim 13, wherein the components b)–d) are present in the following indicated amounts in weight %, based on the solids of the hardener composition:
   b) from 25 to 70 weight %
   c) 10 to 50 weight %
   d) from 4 to 30 weight %.

20. A hardener composition according to claims 13 for use in the formulating of an amino resin based adhesive system.

21. A method of application of an adhesive system according to claim 1, wherein each of the components a)–d) is applied separately onto the surface to be glued.

22. A method of application of an adhesive system according to claim 1, wherein component a) is applied separately and components b)–d) are mixed before application and applied as one component e) onto the surface to be glued.

23. A method of application of an adhesive system according to claim 1, wherein all of the components a)–d) are mixed together at the moment of application and applied as one component onto the surface to be glued.

24. A method of application of a hardener composition according to claim 13, wherein each of the components b)–d) is applied separately onto the surface to be glued.

25. A method of application of a hardener composition according to claim 13, wherein all of the components b)–d) are mixed before application and applied as one component e) onto the surface to be glued.

26. An adhesive system according to claim 1, wherein the amount of etherified amino resin component is greater than or equal to 50 weight %.

27. An adhesive system according to claim 1, wherein the amount of etherified amino resin in the resin component is greater than or equal to 90 weight %.

28. An adhesive system according to claim 1, wherein the components b)-d) are present in the following indicated amounts based on the solids of the adhesive system:
   -b) from 5–60 weight %,
   -c) from 2–40 weight %,
   -d) from 0.1–10 weight %.

29. An adhesive system according to claim 1, wherein the etherified amino resin has a degree of etherification of 4–95%.

30. An adhesive system, comprising a) an etherified amino resin, b) a vinyl acetate copolymer including post-crosslinking groups incorporated by copolymerising one or more ethylenically unsaturated monomers with at least one monomer comprising at least one post-crosslinking group, c) a curing agent comprising carboxylic acid, and d) a polyvinyl alcohol, the amount of the amino resin component being 10–90 weight % based on the solids of the adhesive system.

31. An adhesive system according to claim 30, wherein the components a)-d) are present in the following indicated amounts based on the solids of the adhesive system:

-a) from 40 to 85 weight %,
-b) from 10 to 50 weight %,
-c) from 5 to 20 weight %, and
-d) from 1 to 10 weight %.

32. An adhesive system according to claim 30, wherein the etherified amino resin has a degree of etherification of 10 to 75%.

33. An adhesive system according to claim 1, wherein the amount of etherified amino resin component is greater than or equal to 50 weight %.

34. An adhesive system according to claim 1, wherein the amount is etherified amino resin in the resin component is greater than or equal to 90 weight %.

35. A hardener composition according to claim 13, wherein the components b)-d) are present in the following indicated amounts based on the solids of the hardener composition:

-b) 3–85 weight %
-c) 2 to 50 weight %
-d) 0.1 to 40 weight %.

36. A hardner composition for gluing systems of the amino resin type, comprising, on a 100% solids basis, from 25 to 70 weight % of vinyl acetate copolymer containing post-crosslinking groups, from 10 to 50 weight % carboxylic acid, and from 4 to 30 weight % polyvinyl alcohol.

37. A hardner composition according to claim 36, wherein the post-crosslinking groups are incorporated into the copolymer by copolymerising one or more ethylenically unsaturated monomers with at least one monomer comprising at least one post-crosslinking group.

38. A hardner composition according to claim 36, wherein the copolymer comprises vinyl acetate and N-metholyl-acrylamid.

39. A hardner composition according to claim 36, wherein the carboxylic acid comprises formic acid or maleic acid.

40. A method of gluing two or more substrates, comprising the steps of:

(1) providing at least first and second substrates to be glued;

(2) applying an adhesive system onto a surface to be glued on least one of said substrates, said adhesive system comprising (a) a resin component comprising an etherified amino resin, (b) a polymer prepared from one or more ethylenically unsaturated monomers, (c) a curing agent, and (d) a polyvinyl alcohol, the solids of the adhesive system;

(3) gluing said at least two substrates with said adhesive system.

41. A method according to claim 40, wherein each of the components a)-d) are applied separately onto said at least one substrate.

42. A method according to claim 40, wherein component a) is applied separately and components b)-d) are mixed before application and applied as one component e) onto said surface to be glued.

43. A method according to claim 40, wherein all of the components a)-d) are mixed together at the moment of application and applied as one component onto said surface to be glued.

44. A method of application of an adhesive system according to claim 40, wherein the components a)-d) are present in the following indicated amounts and weight %, based on the solids of the adhesive system:

a) from 40 to 85 weight %,
b) from 10 to 50 weight %,
c) from 5 to 20 weight %, and
d) from one to 10 weight %.

* * * * *